United States Patent [19]

Cope et al.

[11] 4,386,400

[45] May 31, 1983

[54] RESET OF A SELECTED I/O CHANNEL AND ASSOCIATED PERIPHERAL EQUIPMENT BY MEANS INDEPENDENT OF THE CHANNEL

[75] Inventors: Bernard Cope, Wappingers Falls; Kenneth R. Lynch, Rhinebeck; Daniel H. O'Donnell, Woodstock; John T. Rodell, Wappingers Fall, all of N.Y.; William W. Turechek, Algonquin, Ill.; Robert M. Unterberger, Hopewell Junction, N.Y.

[73] Assignee: International Business Machines Corp., Armonk, N.Y.

[21] Appl. No.: 151,048

[22] Filed: May 19, 1980

Related U.S. Application Data

[63] Continuation of Ser. No. 860,813, Dec. 15, 1977, abandoned.

[51] Int. Cl.³ .............................................. G06F 9/06
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,253,262 | 5/1966 | Wilenitz et al. | 364/200 |
| 3,286,240 | 11/1966 | Thompson et al. | 364/200 |
| 3,517,171 | 2/1981 | Avizienis | 235/153 |
| 4,014,005 | 2/1981 | Fox et al. | 340/172.5 |
| 4,271,468 | 1/1981 | Christenson et al. | 364/200 |

OTHER PUBLICATIONS

IBM System/370 Model 168 Maintenance Manual--SY22-6941-3 Fifth Edition, May 1975, Pougkeepsie, N.Y. 0521992 (Part of File).
IBM System 370, Principles of Operation, Form GA-7000-5, pp. 50-53 and 195 (Part of File).

*Primary Examiner*—Harvey E. Springborn
*Attorney, Agent, or Firm*—R. Lieber

[57] ABSTRACT

A central processor through an asynchronous service processor, selectively resets an input/output channel designated in an instruction called Clear Channel that is executed by the central processor. As part of the execution of this instruction, the service processor also communicates a reset signal to the peripheral equipment associated with that channel in case the designated channel is malfunctioning and cannot relay a reset signal normally to the peripheral equipment associated with the designated channel. The reset signal for the peripheral equipment is supplied through a connection between the service processor and particular lines in I/O interface cables of that channel. Programming routines that use the Clear Channel instruction are designed to preserve the integrity of data held by peripheral equipment that is associted with two channels when the peripheral equipment has exclusive affiliations with the designated channel. Other systems that are eligible to communicate with the affiliated equipment are conditioned to a quiescent state before the reset operation is carried out, and are kept in that state until the affiliations are re-established.

5 Claims, 12 Drawing Figures

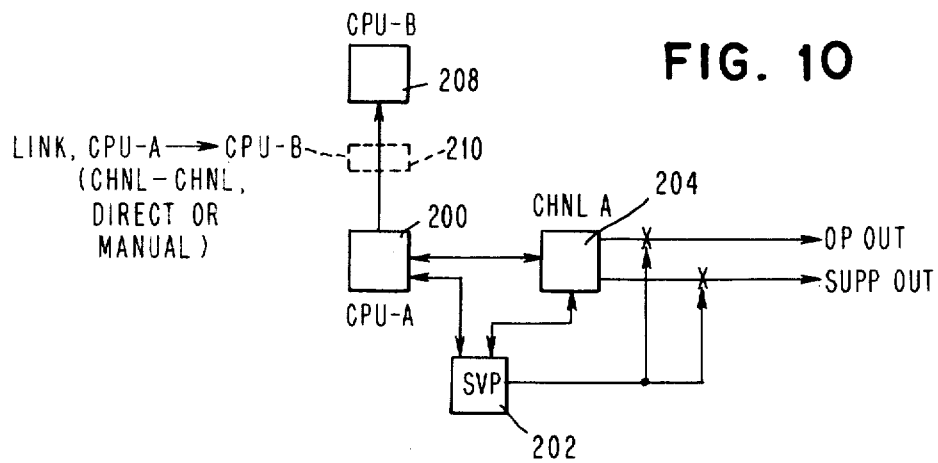
FIG. 10
FIG. 11
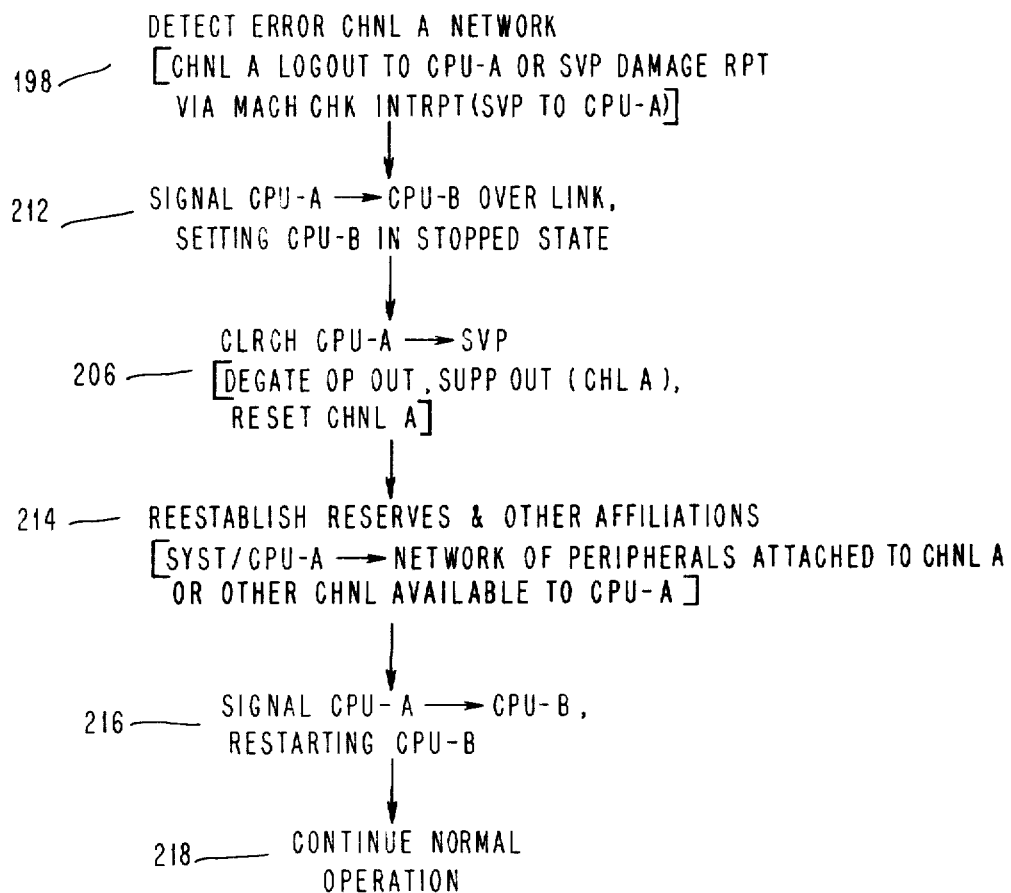

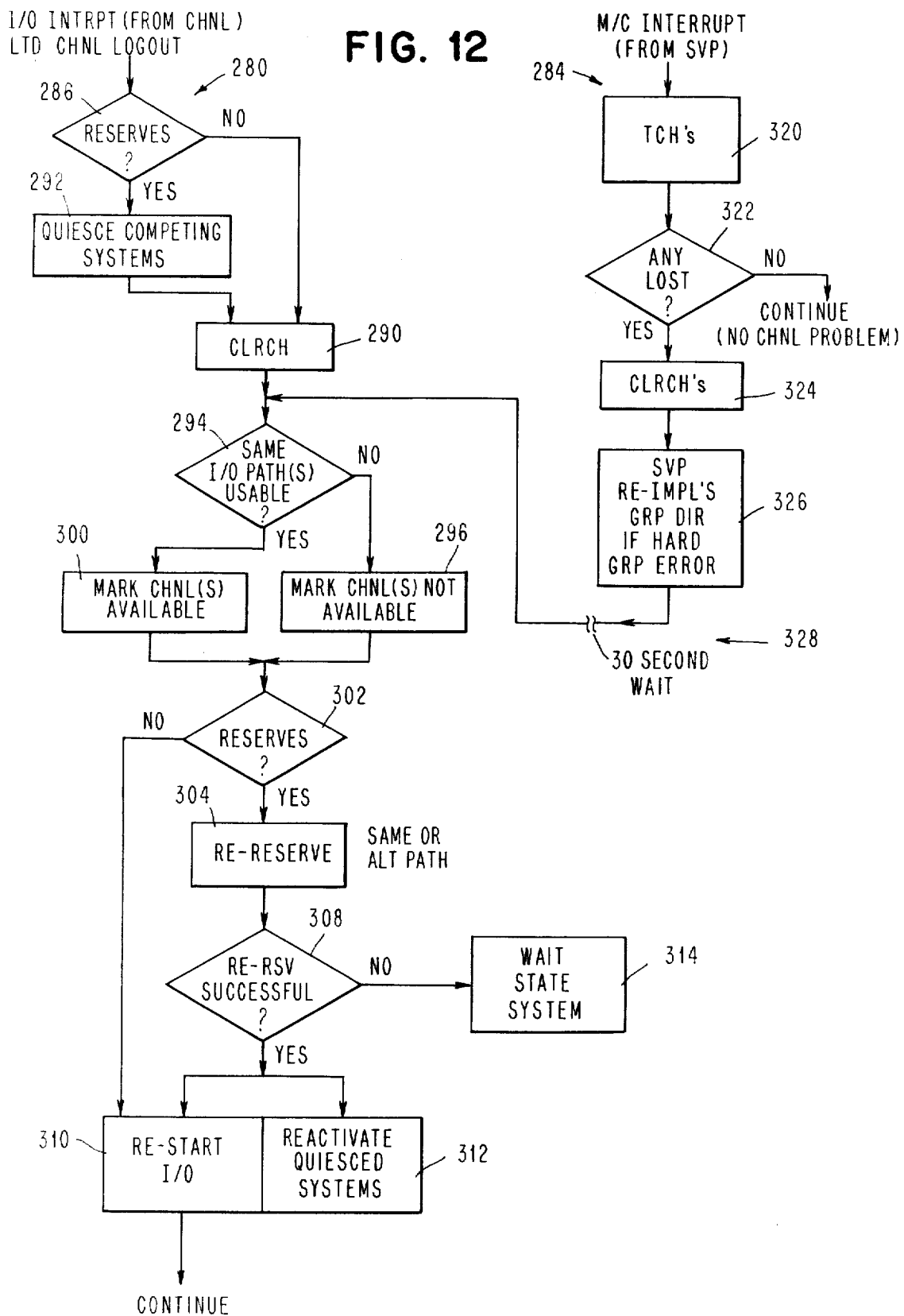

RESET OF A SELECTED I/O CHANNEL AND ASSOCIATED PERIPHERAL EQUIPMENT BY MEANS INDEPENDENT OF THE CHANNEL

This is a continuation of application Ser. No. 860,813, filed Dec. 15, 1977, now abandoned.

CROSS-REFERENCES TO RELATED PATENTS, PATENT APPLICATIONS AND PUBLICATIONS

U.S. Pat. No. 4,110,830 to M. A. Krygowski entitled "Channel Storage Adapter", and U.S. Pat. No. 4,126,897 to R. S. Capowski et al entitled "Request Forwarding System", both filed July 5, 1977, and assigned to the assignee of this application, describe an I/O system environment relative to which the present invention can be used to advantage.

U.S. Pat. No. 3,488,633 to King et al, describes prior art channel apparatus having I/O System Reset capability.

U.S. Pat. No. 3,400,371 to Amdahl et al describes an environmental system improvable by the present invention.

U.S. Pat. No. 3,786,430 to Hajdu et al describes a system for attaching auxiliary processing logic to a central processing system for carrying out ancillary processing functions; auxiliary logic of this type being adaptable to carry out the "programmable selective I/O System Reset" operation of this invention.

FIELD OF THE INVENTION

This invention relates to data processing systems having an I/O System Reset capability (reference IBM System/370 Principles of Operation, Form GA22-7000-5, File No. S/370-01, pages 50-53 and 195). Such resets are used to reset I/O channels and attached peripherals. Resetting of the peripherals terminates reserves and other affiliations between the peripherals and respective channels.

STATEMENT OF THE PROBLEM

Ordinarily, the foregoing I/O System Reset action is evoked manually when automatic error recovery procedures (e.g., retry) are inadequate. This type of reset usually affects all physically available channels and peripheral equipment in the system. The manual action and lack of selectivity may degrade processing efficiency.

Another problem in regard to the foregoing I/O System Reset is that affiliations between the channels and switchably attached peripherals—such as device reserves—are terminated by the reset. In respect to the nature and utilization of device reserves refer, for instance, to IBM System/360 Component Description—2841 Storage Control, IBM Systems Reference Library File No. S360-07, Form A-26-5988-3, Pages 32, 33 and Component Summary 3830 Storage Control, 3330 Disk Storage, Form GA26-1592-0, Page 10. Termination of such affiliations renders each reserved device potentially accessible to another loosely coupled (independently supervised) system before its affiliation can be reestablished in the system which originated the reset. Consequently the integrity of shared data may be compromised.

Another problem in respect to I/O System Reset is that the reset can fail if an I/O channel is unable to relay the reset signal to its peripheral interface.

Another problem is that if a group of plural channels time share a single control mechanism disablement of either that mechanism or any channel of the group may disable the entire group and also block execution of "I/O System Reset".

SUMMARY OF THE INVENTION

The present invention comprises a facility subject to program control for performing the action of I/O System Reset selectively relative to one channel and I/O interface. Program restrictions preclude use of this facility relative to devices and/or control units which have unprotected reserves (or other affiliations). The facility is used only by supervisory programs and only by programs which can act to secure the deactivation of other loosely coupled systems before evoking the reset and thereby "protect" device reserves and other affiliations. This preserves the integrity of shared data in reserved peripherals accessible to the other systems. After imposing the reset and reestablishing reserves and other affiliations, the supervisory program acts to secure the reactivation of the other (deactivated) systems.

The foregoing reset facility resides partially in auxiliary logic which is adapted to operate as an "agent" of the central processing system which executes program instructions. The auxiliary logic may be adapted to carry out the reset asynchronously; i.e., after execution of a program instruction designating the reset. Consequently the burden on central processing efficiency may be decreased. The auxiliary processor has independent control of the channel I/O interface lines which signal the reset to peripherals associated with each channel (i.e., the "operational out" and "suppress out" lines). Consequently execution of the reset cannot be blocked by a hung channel or a hung group of commonly controlled channels.

DESCRIPTION OF THE PRIOR ART

Program controllable origination of system resets is not a generically original concept. For instance, U.S. Pat. No. 3,787,891 to B. B. Moore et al describes a signal processor instruction (SIGP) capable of indirectly producing an I/O System Reset. Execution of the instruction causes an exchange of command and status information between communicating processing systems. Such commands may be used to originate Initial Program Reset and Program Reset operations in a system receiving the command (refer to Col. 6, line 58 to Col. 7, line 8 in the disclosure of the Moore et al patent), and thereby evoke I/O System Resets in channels attached to a system receiving the command. However, such resets are unselective (do not designate individual channels) and thereby cause resetting of all channels attached to the system obeying the command. Also, the command may not be executable relative to peripherals attached to a blocked channel.

The present invention is more efficient inasmuch as it addresses the reset function to one selectively specified channel and I/O interface, and it is carried out by a small auxiliary processor which directly controls the specified I/O interface regardless of the condition of operation of the associated channel.

The present invention is also unique in respect to its protection of data integrity in reserved or affiliated peripherals accessible to other loosely coupled systems. This aspect of the invention will be more fully appreciated as the following description unfolds.

BRIEF DESCRIPTION OF THE DRAWINGS

FIGS. 10-12 illustrate how the instruction of FIG. 7 is used and how device reserves are protected (i.e., how data integrity is protected) relative to other loose coupled (independently supervised) processing systems.

DETAILED DESCRIPTION

INTRODUCTION—THE PROBLEMS

Figure 1:
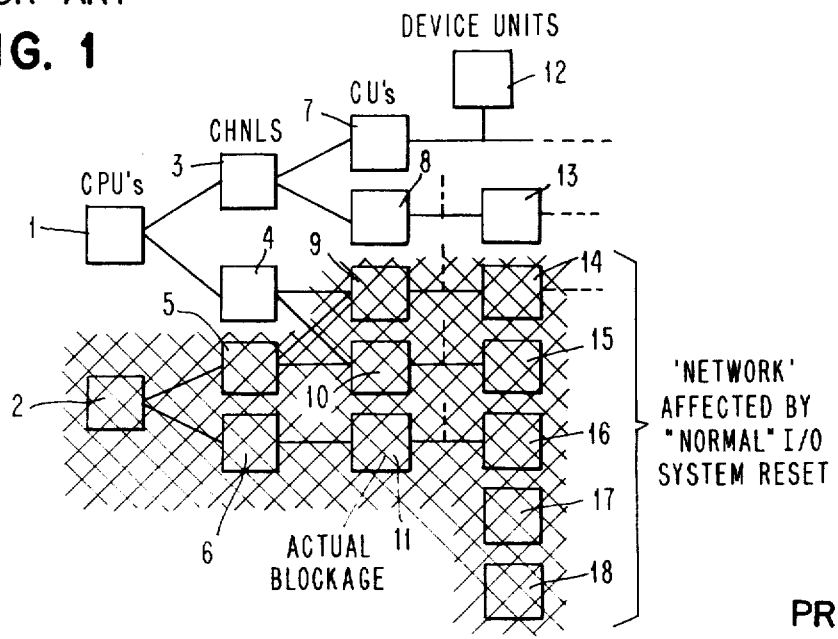
FIGS. 1-5 illustrate various problems which can be circumvented by the present invention.

Consider the network of data processing equipment shown in FIG. 1. Central Processing Units (CPU's) 1 and 2 connect variously to I/O channels 3-6. Channels 3-6 connect variously to control units (CU's) 7-11. The control units connect to many devices, a few of which are shown at 12-18.

Notably control units 9 and 10 cross-connect to channels 4 and 5 permitting devices attached to these control units to be connected switchably to either CPU 1 or CPU 2. Such connection is usually accomplished by a two-channel switch special feature (refer, for instance, to IBM System/360 Component Description 2841 Storage Control, IBM Systems Reference Library, File No. S360-07, Form A26-5988-3, pages 32 and 33, and IBM Component Summary 3830 Storage Control, 3330 Disk Storage, Form No. GA26-1592-0, Page 10). The systems associated with CPU's 1 and 2 are loose coupled, meaning that the supervisory programs in control of these CPU's are relatively independent.

Now assume that an unselective "program reset" function (refer to IBM System/370 Principles of Operation, Form GA22-7000-5, File No. S/370-01, Page 51) is originated relative to CPU 2 (usually this function is originated manually by operation of a console switch or push-button). This causes a CPU reset to be applied to CPU 2 and an I/O System Reset to be applied to channels 5 and 6 (refer to the above-referenced System/370 Principles of Operation, Page 51). In turn channels 5 and 6 produce system reset signals at their respective I/O interfaces and thereby reset control units 9-11 and associated devices 14-18 (refer to IBM System/360 and System/370 I/O Interface Channel to Control Unit, original equipment manufacturer's information, Form No. GA22-6974-2, File No. S/370-19, page 20).

Consequently the entire network of equipment indicated by cross-hatching in FIG. 1 is reset and all processing operations relative to that network require reinitiation. But assume for instance that the problem for which the program reset is being applied is confined to control unit 11 (note the "actual blockage" indication in FIG. 1) and that the supervisory program associated with CPU 2 could be apprised of this; for instance, by an I/O interruption and limited channel logout from channel 6 (refer to IBM System/370 Principles of Operation, Form GA22-7000-5, File No. S/370-01, Pages 226-228 and 236-242). If the program also had the facility to produce an I/O System Reset directed to channel 6 and no other channel then only channel 6, control unit 11 and devices represented at 16-18 would be reset, leaving channel 5, control units 9 and 10, and the set of devices represented at 14 and 15 unaffected. Quite clearly the volume of processing activity affected by the reset could be reduced considerably (considering that the set of equipment associated with a typical control unit might comprise hundreds of devices). Consequently it should be appreciated that a selective I/O System Reset function under program control could be inherently useful in such circumstances.

Another aspect of the problem is illustrated with reference to FIG. 2. For the sake of simplicity this figure shows a single direct access storage device (DASD) 40 connected switchably—via control unit 41 and channels 42 and 43—to loosely coupled (independently supervised) data processing systems associated with central processing units 44 and 45 (these two systems are also termed systems A and B). In respect to such switchable connection of devices refer, for instance, to the above-referenced IBM System/360 Component Description 2841 Storage Control at page 33.

Figure 2:
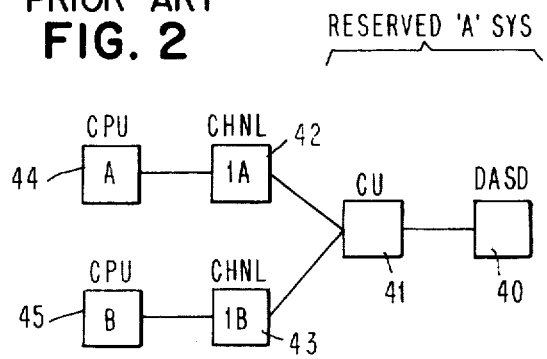

Now assume that device 40 has been reserved by the "A" system as suggested in FIG. 2; e.g., by a "device reserve". For the meaning of "device reserve" refer to the above-referenced IBM System/360 Component Description 2841 Storage Control at page 32 and Component Summary 3830 Storage Control at Page 10. It should be understood that device reserve is a specific command issued through a channel and control unit in one system causing a designated/specified device to appear "busy" continuously relative to other "loose coupled" systems until a specific release command is issued by the reserving system (refer to page 33 of said 2841 reference).

Figure 3:
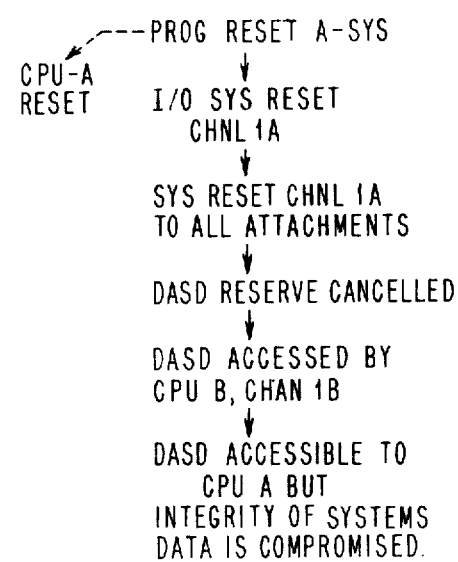

As shown in FIG. 3 an unselective program reset in the A system causes a CPU reset in CPU 44 and an I/O System Reset in channel 42. The I/O System Reset causes channel 42 to present a system reset signal to all of its attached control units, including control unit 41, which causes the respective control units to reset all devices associated with channel 42.

The resetting of the devices terminates respective device reserves, making devices such as device 40 appear accessible to systems operating on both CPU's 44 and 45. This enables system B operating on CPU 45 (CPU B) and channel 43 to use and/or modify data in devices such as 40. Consequently the integrity of said data relative to either system has been potentially compromised by the reset action, as indicated in the last sequence step entry of FIG. 3. Accordingly, even if system A could subsequently resecure its reserves relative to devices such as 40 the integrity of the data being used by that system prior to the reset could not be guaranteed.

Another problem in respect to reserved devices and control units is that of path allegiance. Reserved control units and certain other control units (such as the IBM 3830 Storage Control Unit while operating in search mode) are adapted to maintain exclusive path allegiance to one specific associated channel path. When addressed through another channel path during the tenure of such allegiance these control units manifest busy status and thereby appear inaccessible. Reserved devices (and other devices so adapted; e.g., an IBM 3330 disk storage facility associated with a 3830 Control Unit) have similar exclusive path allegiance to one particular channel and control unit path and will not allow communication via any other path.

Peripherals having such path allegiance respond to ordinary system reset signals only when such signals are presented through the allied path. Consequently if a channel becomes incapacitated by a problem not affecting the functional operability of associated allied peripherals (e.g., by an internal channel failure or an external hangup on the I/O interface) and cannot for that reason "relay" a system reset signal to the associated I/O interface, the allied peripherals may be effectively isolated and useless even though they would be accessible through alternate paths if reset.

The foregoing problem discussion suggests that a new I/O resetting function is required which: (1) can be directed selectively to a specific channel and I/O interface; (2) can be evoked under supervisory program control (so that reserves can be protected and alternate paths selectively configured); and (3) can be executed relative to the associated I/O interface and peripherals even when the designated channel is incapacitated. The present invention fulfills all of these requirements.

Figure 4:
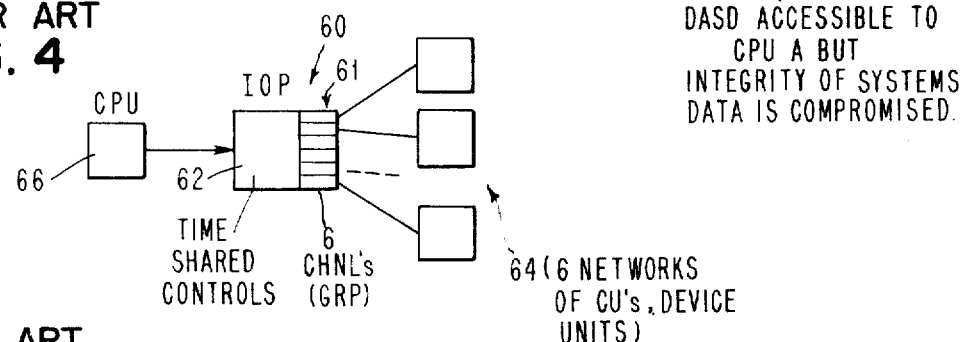
Figure 5:
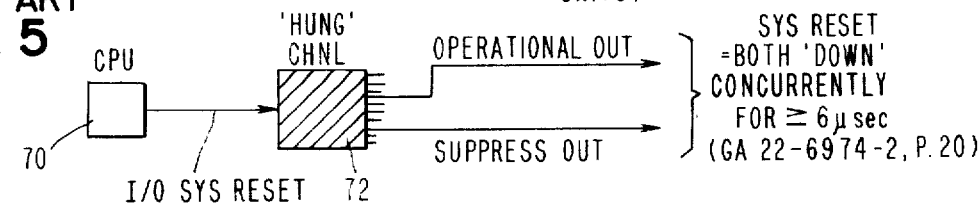

FIGS. 4 and 5 illustrate another aspect of the I/O System Reset problem. I/O processing system 60 comprises a group of six channels 61 having time-shared microprocessing controls 62. Each channel has a separate I/O interface and network of associated control units and device units. These are indicated collectively at 64. The entire group of channels is associated with one central processing system having a central processing unit 66. Consequently a blockage (hang-up) in controls 62 or any channel could effectively incapacitate the group and potentially prevent resetting of the group.

The blockage problem relative to a single channel is seen in FIG. 5. Central processing unit 70 is attempting to evoke an I/O System Reset relative to a blocked or "hung" channel 72. Conventionally this type of reset action requires the channel to coincidentally manifest "down" signal levels on "operational out" and "suppress out" lines of its I/O interface (reference IBM System/360 and System/370 I/O Interface, Channel to Control Unit, Original Equipment Manufacturers Information, Form GA22-6974-2, File No. S/360-S370-19, pages 6-11 and 20). When properly executed by the channel this action causes all control units, and their associated devices, attached to that interface to be reset. However, if a channel is blocked or "hung" (FIG. 5) it may be incapable of carrying out the foregoing action relative to its "operational out" and "suppress out" lines. Furthermore, if a group of channels operating under common microprogram controls is blocked all channels of the group may be isolated from control of their respective "operational out" and "suppress out" lines (FIG. 4).

Accordingly, one feature of the present invention is the provision of auxiliary logic for inhibiting "operational out" and "suppress out" at individual I/O interfaces independent of channel operability.

SYSTEM AND METHOD OF THE PRESENT INVENTION

The system and method of the present invention will now be described in terms of functional block diagrams and logic flow diagrams in FIGS. 6-12. The specific logic may vary greatly depending on circuit technology and micro-sequence-control usage. Those skilled in the art will recognize readily that buffers, registers, gates and timing and sequencing controls for the functions described herein can be chosen routinely and variously with the exercise of ordinary skill.

Figure 6:
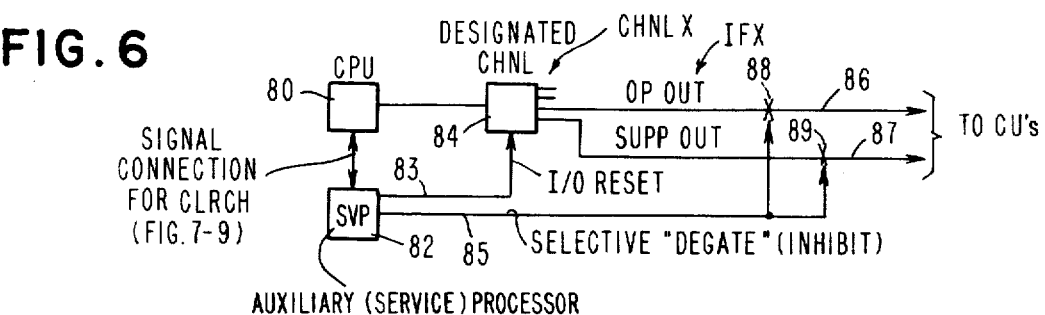
FIG. 6 illustrates a system embodying the subject invention.
Figure 7:
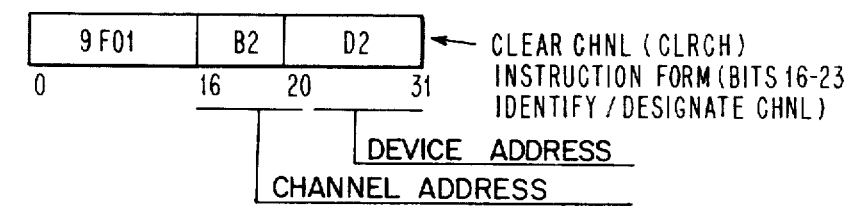
FIG. 7 illustrates the form of a program instruction CLEAR CHANNEL for originating selective I/O System Resets in accordance with the subject invention.

Referring to FIGS. 6 and 7 the subject "program controllable selective I/O System Reset" is carried out through the interaction of a CPU 80 with an auxiliary (service) processor 82 (SVP). The reset function is designated by a CLEAR CHANNEL (CLRCH) program instruction having the form shown in FIG. 7. The instruction is executed by the CPU only when the CPU is in supervisor state; i.e., only as a step in a supervisory program (refer to "Principles of Operation" GA22-7000 page 10) and only when reserves have been protected as described later. Bits 16-23 of the instruction designate one channel and by implication the associated I/O Interface. The instruction causes the CPU 80 to present a signal to auxiliary processor 82 indicating the channel and interface to be reset. The latter processor returns a condition code signal indicating the status of its handling of the designated reset function.

If the designated channel is physically available the auxiliary processor 82 returns a condition code 0 and carries out the required reset signaling operation relative to the designated channel and associated interface. If the designated channel is not physically available the auxiliary processor returns condition code 3 and does not perform any other function. Upon receiving the condition code the CPU terminates its execution of the CLEAR CHANNEL instruction.

In carrying out the reset operation (associated with return of condition code 0) the auxiliary processor transfers first and second reset signals relative to the channel 84 designated by the instruction. The first reset signal is passed via line 83 (FIG. 6) to the designated channel and resets that channel. The second reset signal is passed via line 85 (FIG. 6) to logical gating circuits connecting channel 84 with its associated operational out and suppress out lines, 86 and 87. These gating circuits, represented at 88 and 89 (FIG. 6), are effectively inhibited by the second reset (degate) signal on line 85. This causes operational out and suppress out to remain down concurrently for the time required to manifest system reset (at least 6 microseconds) and thereby serves to manifest the system reset signal to the peripheral equipment attached to the respective interface.

The action of the auxiliary processor in carrying out the foregoing reset signaling operation may be either asynchronous or synchronous relative to the return of the condition code (i.e., relative to termination of the execution of the respective CLEAR CHANNEL instruction by CPU 80).

Referring to FIG. 7 the format of the CLEAR CHANNEL instruction is similar to the well known "S format" (reference IBM System/370 Principles of Operation, Form GA22-7000-0, File No. S/370-01, page 21). The first sixteen bits represent the operation (OP) code in hexadecimal notation. The last sixteen bits are used in accordance with page 197 of the above-referenced IBM System/370 Principles of Operation to determine the address of the channel and interface to be reset. The displacement argument, represented by bits 20-31 of the instruction, is added to bits 20-31 of a word contained in the general register designated by bits 16-19 of the instruction. Bits 20-23 of the result represent the address (identity) of the channel to be reset (and by implication the associated interface).

The first eight bits of the operation code portion are identical to corresponding bits of the TEST CHANNEL instruction (refer to the above-referenced IBM System/370 Principles of Operation at page 207). Bits 8-15 of this instruction are ignored by IBM System/370 processors which are not adapted for executing the CLEAR CHANNEL function. Such processors interpret CLEAR CHANNEL as an ordinary TEST CHANNEL (TCH) instruction and perform the TEST CHANNEL function (i.e., sense status of the channel designated by bits 16-23 and store a corresponding condition code). However processors adapted to perform the CLEAR CHANNEL function, such as CPU 80, interpret the OP code as a CLEAR CHANNEL instuction and execute the associated reset function (i.e., pass reset signals conditionally via auxiliary processing logic such as 82 and receive an associated condition code).

DETAILS OF CLEAR CHANNEL INTERPRETATION AND SELECTIVE I/O SYSTEM RESET OPERATION

Figure 8:
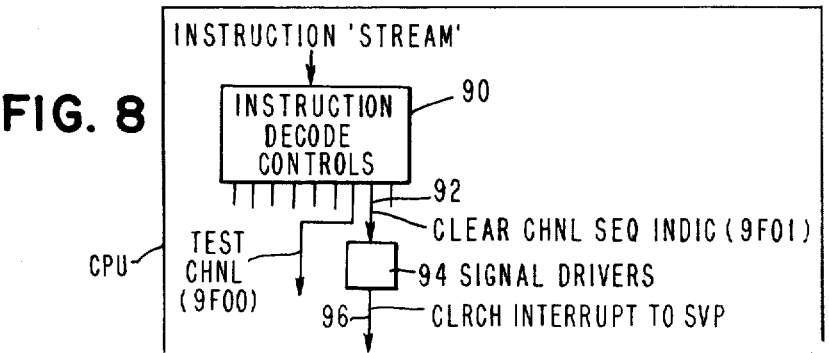
FIG. 8 illustrates the action of a central processor in interpreting a CLEAR CHANNEL instruction having the form shown in FIG. 7.
Figure 9:
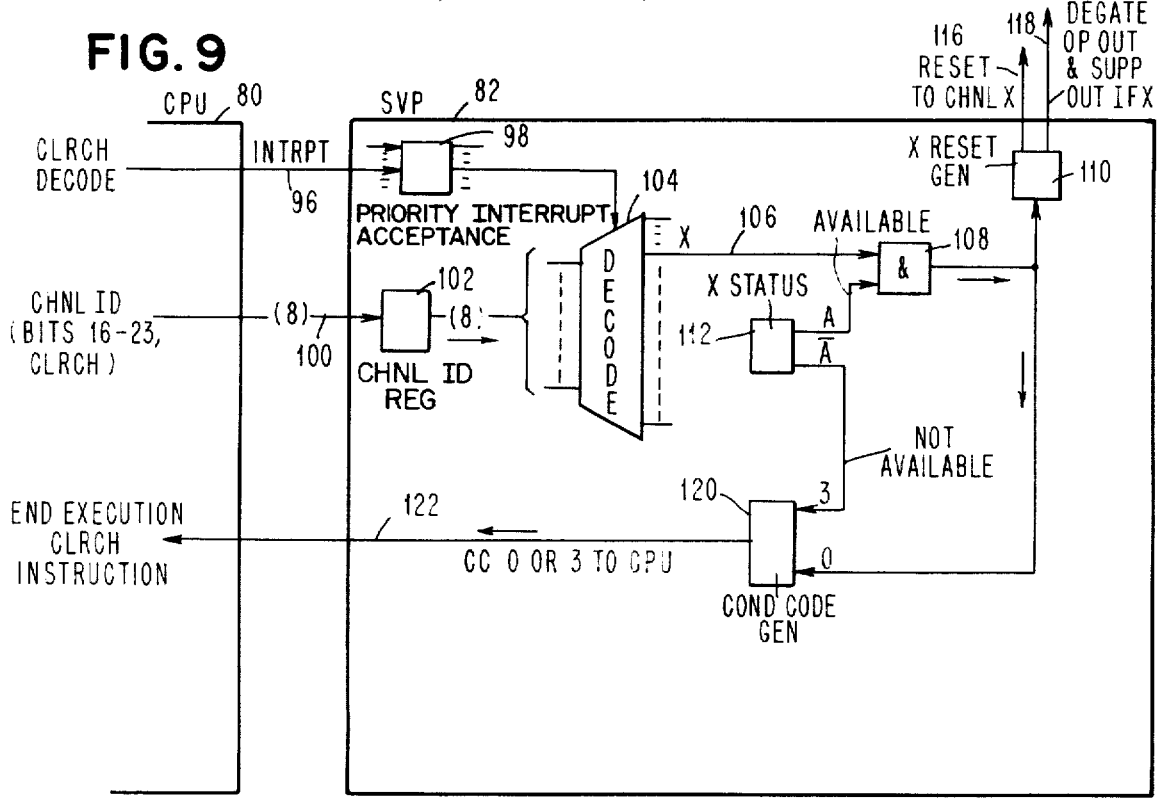
FIG. 9 illustrates the logical organization of the auxiliary processing element of FIG. 6, in respect to execution of the subject selective I/O System Reset operation.

FIGS. 8 and 9 respectively illustrate the logical functions required in CPU 80 for interpretation of the CLRCH (CLEAR CHANNEL) instruction and the logical functions and interfaces required in auxiliary processor 82 to perform the associated reset operation. Block 90 (FIG. 8) is meant to represent the conventional instruction decoding facility of an IBM System/370 central processor augmented by an additional decode output 92 associated with CLRCH. Output 92 conditions signal drivers 94 to present an associated interruption signal to the auxiliary processor 82 shown in FIG. 9 via connection 96.

Interrupt acceptance controls 98 in the auxiliary processor—which may be capable of reacting to multiple interruption sources on a prioritized basis—respond to the foregoing interruption signal by allowing channel identity information (determined by bits 16-23 of the instruction) to be passed from CPU 80 to auxiliary processor 82 via connection 100 and stored in register 102 in the auxiliary processor.

Acceptance of the interruption also primes decoder logic function 104 to translate the channel identity code in register 102 into an associated signal condition on decoder output line 106 which prepares logical AND function 108. AND function 108 controls reset signal generation at 110 relative to the designated channel X (channel 84, FIG. 6) and relative to the associated I/O interface (IFx) for manifesting system reset externally (via operational out and suppress out). Decoder function 104 has an output for each channel of the system which prepares an associated AND function such as 108 relative to an associated reset signalling linkage such as 110.

AND function 108 is also conditioned by "X Status" state latching function 112; there being one such bi-state latching function associated with each output of decode function 104 (i.e., for each channel). Latching function 112 indicates the physical availability of the designated-/associated channel (X) in the system. If the designated channel is available the associated latching function will be set and operate through associated AND function 108, signal function 110 and signal links 116 and 118 to transfer reset signals to the designated channel (via path 116) and interface (via path 118). The interface reset signal inhibits operational out and suppress out in the associated I/O interface for at least six microseconds. Consequently these I/O interface lines are held down for at least six microseconds and thereby manifest system reset to the peripherals attached to said interface.

AND function 108 and latch function 112 control condition code generator 120 to return a condition code to CPU 80, via return path 122. This code is stored and made accessible to the supervisory program which issued the respective CLEAR CHANNEL instruction. Return of the condition code terminates the execution of the respective CLEAR CHANNEL instruction.

In the preferred embodiment the condition code is a two-bit code potentially capable of manifesting four conditions or states but used primitively to manifest only two conditions. Condition 0 is used to represent ability to complete the I/O System Reset action relative to the designated channel. Condition codes 1 and 2 are not used but are available for future applications. Condition code 3 (latch function 112 reset) represents that the designated channel is not operational (not physically available) in the system.

Execution of the reset action causes all inbound interface lines at the designated interface to drop after a delay dependent on external cable lengths.

USE OF CLEAR CHANNEL RELATIVE TO RESERVED PERIPHERALS

FIG. 10 shows in part a fragment of the conventional system of FIG. 2 in which a peripheral device is accessible to either of two processors A and B. The components of this system that are shown in FIGS. 10 and 11 illustrate how the subject CLEAR CHANNEL instruction is used in system A relative to reserved devices which are potentially accessible to independently supervised system B.

As suggested at 198 (FIG. 11), system A—associated with CPU 200, auxiliary processor 202 and multiple channels including channel 204 (FIG. 10)—may detect an error in the I/O path associated with channel 204. Such error may be manifested to the supervisory program of system A either by an I/O interruption and limited channel logout from channel 204 (when channel 204 is operational) or by a machine check interruption from auxiliary processor 202 (if the channel is disabled and the auxiliary processor has facilities for detecting such disablement).

Before issuing CLEAR CHANNEL relative to channel 204 (step 206 FIG. 11) the supervisory program of system A instigates the deactivation of system B (shown at 208 FIG. 10) which has potential access to a device attached to channel 204 and reserved to system A. Such deactivation is secured via a "link" 210 (FIG. 10) between the two systems. Link 210 may be an all-electrical link (channel-to-channel or direct control) between the two systems or it may include manual intervention (e.g., a console signal in system A to a human operator and manual deactivation of system B by the same or another operator). The foregoing deactivation step is suggested at 212 (FIG. 11).

After the CLEAR CHANNEL selective I/O System Reset has been carried out relative to channel 204 (step 206 FIG. 11) the reserves and other affiliations between system A and the peripherals attached to channel 204 (which have been terminated by the reset) are reestablished as indicated at 214 (FIG. 11). Then the deactivated systems, such as system B, are reactivated, as shown at 216 (FIG. 11), via the link 210 discussed above. Both systems may then resume their normal/independent operations as suggested at 218 (FIG. 11). The deactivation of system B has prevented system B from compromising the integrity of data used by system A after the reset step 206 and before the reestablishing step 214.

USE OF CLEAR CHANNEL IN GENERAL

FIG. 12 illustrates more specifically how the subject CLEAR CHANNEL reset is used by supervisory control programs. The program has two discrete sequence paths for access to the reset function associated with the CLEAR CHANNEL (CLRCH) instruction. Sequence path 280 is associated with recovery from problems manifested by I/O interruptions and sequence path 284 is associated with recovery from problems manifested by machine check interruptions. I/O interruptions are presented by specific channels and thereby discretely identify the I/O path which may require resetting. Machine check interruptions are presented by processing entities such as the auxiliary service processor discussed previously (SVP, No. 82, FIG. 9) and need not provide specific identification of any I/O path nor even indicate necessity for resetting an I/O path.

In program sequence path 280 the action taken when a CLRCH reset is required depends upon the status of peripheral equipment reserves. This status is tested at program decision point 286 and if there are no reserves the program sequence branches directly to the issuance of the CLRCH instruction at 290. If reserves (or other allegiances) are in force at decision point 286 the program operates at 292 to secure the deactivation of competing (potentially interfering) systems (or processes) before proceeding to the issuance of the CLRCH reset at 290.

After issuing the CLRCH reset at 290 the program branches at 294 on the condition of the I/O path associated with the reset. The condition of reusability of this path, if not manifested in the status information exchanged by the I/O interruption, may be determined by execution of TEST CHANNEL (TCH) and/or TEST I/O (TIO) System/370 instructions directed to that path. The condition of the reset path is noted as either not available at 296 or available at 300 and the program branches at 302 on the reserve status as determined at decision point 286.

If reserves or other allegiances had been in force prior to the reset the program attempts to reestablish corresponding reserves over either the same I/O path or an alternate path (if the same path is not available and an alternate path is), as suggested at 304, and then evaluates the effectiveness of its attempted action at 308. If the attempted action was successful the program restarts the I/O processes associated with the reset path as suggested at 310 and reactivates the systems quiesced earlier (in program step 292) as suggested at 312. If no reserves were in force prior to the reset the program would proceed directly from test 302 to an attempted restarting of the I/O processes affected by the reset (over the same channel path, and if that attempt is unsuccessful over an alternate path if one exists). After step 310 the program continues relative to other functions (other than resets). If the I/O restarts at 310 are unsuccessful the program posts a permanent error indication before continuing. If tests 308 indicate unsuccessful reestablishment of reserves the program places the system in the wait state as indicated at 314, which then requires manual intervention before system operations can be continued.

In program path 284 associated with machine check interruption the program issues a number of TEST CHANNEL (TCH) instructions as suggested at 320 and thereby determines at 322 whether any specific channels in a group (e.g., 61, FIG. 5) have been "lost". If determination 322 indicates that no channels have been lost the program continues its normal operation to determine the cause of the interruption having effectively recognized that the cause is not in the channels or I/O paths and that resets are not required. If, on the other hand, the determination at 322 indicates a loss of channels the program implements a series of CLRCH resets relative to the affected group of channels as suggested at 324. These resets are executed consecutively by the auxiliary service processor 82 (FIG. 9). As suggested at 326 if a hard error has been encountered the service processor may re-initiate the group director (see e.g., 62, FIG. 4) by an initial microprogram reloading (Re-IMPL) operation before the program continues with functions 294–314 explained previously. If Re-IMPL action 326 is taken a thirty second delay suggested at 328 is imposed on the continuation of program operation relative to functions 294–314.

It may now be appreciated that with the foregoing CLRCH instruction capability, and with associated programming restrictions on its usage as indicated in FIG. 12, a reset facility is provided which: (1) permits a system reset action to be directed selectively to one specific channel and associated I/O interface; (2) is subject to supervisory program control, and thereby subject to be used only when outstanding reserves have been protected (by quiescing of potentially interferring systems) and only when I/O paths (the original paths or alternate paths if required and if available) are available for re-establishment of the reserves; and (3) can be executed relative to the designated I/O interface even when the designated channel is incapacitated.

While the invention has been particularly shown and described with reference to preferred embodiments thereof, those skilled in the art will recognize that the above and other changes in form and details may be made therein without departing from the spirit and scope of the invention.

What is claimed is:

1. In a data processing system having multiple I/O channels, each channel having means responsive to a signal for being reset, each channel having an I/O interface for attachment of peripheral equipment, the peripheral equipment having means responsive to a reset signal via said interface for being set, a reset control system comprising:

main processing means (90, FIG. 8) responsive to an instruction of predetermined form (FIG. 7) designating one of said channels to be reset; and auxiliary processing means (82, FIG. 9) operable independently of said channels and including means responsive to said command signal for applying a first reset signal (83, FIG. 6; 116, FIG. 9) directly to the designated channel and for applying a second reset signal (85, FIG. 6; 118, FIG. 9) directly to the I/O interface associated with said channel;

said first signal conditioning said channel to a reset state and said second signal being communicated via said interface to the peripheral equipment associated with said designated channel for conditioning said peripheral equipment to reset states.

2. In a data processing system having a reset control system in accordance with claim 1 including:

means (112,120) in said auxiliary processing means (82) responsive to said command signal for communicating condition information (CC 0 OR 3) to said main processing means for indicating the physical availability of the designated channel and associated interface.

3. In a data processing system according to claim 1, wherein each channel contains means (86,87) for producing operational out and suppress out control signals via on the interface and wherein normal reset signals to said peripheral equipment are produced at each interface by the coincident absence of both said operational out and suppress out signals for a predetermined minimum interval of time;

means (88,89) in the interface of each of said I/O channels and connected to said auxiliary processing means for receiving signals to coincidently inhibit said operational out and suppress out signals to reset the peripheral equipment connected to the designated channel.

4. A data processing system in accordance with claim 1 wherein said peripheral equipment is subject to being reserved so as to control potentially interfering access by different systems and wherein said system has means (210) for producing said reset command signals relative to the reserved peripheral equipment only if other systems capable of having potentially interfering access to equipment currently affiliated exclusively with said selected channel are deactivated prior to said production of said command signal to said auxiliary processing means.

5. In a first data processing system communicating through a channel on an exclusive reservation basis with a peripheral device which otherwise would be accessible for communicating with another independently supervised second processing system, said reservation being terminable by said first system through execution of either an express release operation when the reservation becomes unneeded or through an I/O system reset operation while the reservation is to be maintained, said channel having means responsive to a signal for resetting and said device having means responsive to a signal via an interface connecting the channel and the device for resetting, the method of applying an I/O system reset operation in said first system comprising;

quiescing said second system to prevent its access to any reserved peripheral equipment on the designated channel, then producing an I/O system reset command signal under program control in said first system, and designating one I/O channel in said first system and one associated interface path linking said designated channel with said device;

transferring reset actuating signals to said designated I/O channel and to the associate interface path, through signal connection paths external to said designated I/O channel, thereby causing said channel and reserved device to be conditioned to reset states and thereby causing said reservation to be terminated;

ascertaining the effectiveness of said reset operation in re-establishing reusability of said channel and said peripheral device said first system;

re-establishing the reservation of said device in said first system in response to said indication of effectiveness when said one channel and I/O path, or an alternate channel and I/O path, is available for said re-establishing; and thereafter permitting said quiesced second system to be reactivated.

* * * * *